M. R. COWELL.
CONNECTING DEVICE.
APPLICATION FILED JAN. 6, 1914.

1,178,135.

Patented Apr. 4, 1916.

WITNESSES
M. R. McInnis
G. E. Sorensen

INVENTOR
MARCUS RAY COWELL
BY Paul & Paul
ATTORNEYS

THE COLUMBIA PLANOGRAPH CO., WASHINGTON, D. C.

UNITED STATES PATENT OFFICE.

MARCUS RAY COWELL, OF ST. PAUL, MINNESOTA.

CONNECTING DEVICE.

1,178,135.  Specification of Letters Patent.  Patented Apr. 4, 1916.

Application filed January 6, 1914. Serial No. 810,612.

*To all whom it may concern:*

Be it known that I, MARCUS RAY COWELL, a subject of the King of Great Britain, residing at St. Paul, in the county of Ramsey and State of Minnesota, have invented certain new and useful Improvements in Connecting Devices, of which the following is a specification.

This invention relates to improvements in connecting devices which may be used for connecting a large variety of articles or devices, and particularly devices designed for connecting the different parts of harnesses, one to another; for connecting harness tugs or traces to single or double trees or other parts of vehicles; for connecting neck-yokes to tongues or poles; or for connecting harness straps to neck-yokes.

The device may be used for connecting many other articles.

An object of the invention is to provide an improved and simplified form of connecting device which will securely retain the parts together and yet permit their rapid release when desired.

Another object is to provide a device that will not become disengaged by the jarring during movement of the connected parts.

Another object of the invention is to provide an instrument of the class specified, which from an operative standpoint will in usage possess a high degree of efficiency and effectiveness and which, structurally considered, will be of the greatest possible simplicity, being composed of but few parts, all capable of being made at a minimum cost, and individually so formed as to be capable of being readily assembled in a neat and compact arrangement for accomplishing the purpose intended.

Other objects and advantages will be in part obvious and in part pointed out hereinafter, and with these and other ends in view the invention consists generally in the constructions and combinations hereinafter described and particularly pointed out in the claims.

Figure 1:
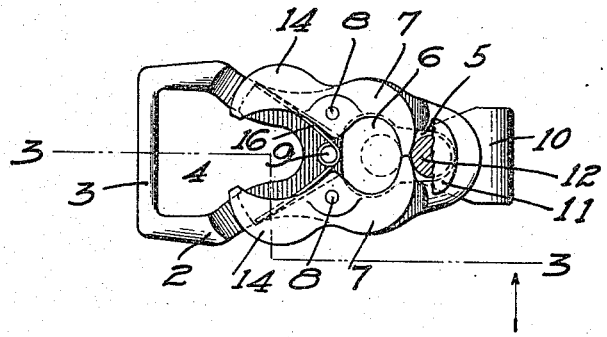
Figure 2:
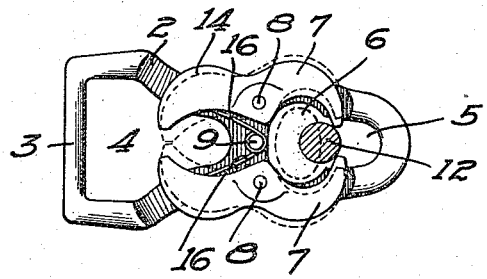
Figure 3:
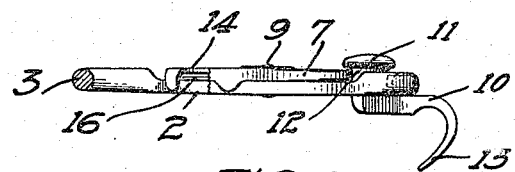

In the accompanying drawings forming part of this specification, Figure 1 is a plan view of the device, the parts being in connected position, and the head of the stud being partly broken away, Fig. 2 is a similar view of the supporting member, the stud of the locking member being shown in section in position to partially open or separate the dogs, Fig. 3 is a section on line 3—3 of Fig. 1.

In the drawings, 2 represents one member of the coupling device, which is preferably formed of metal, suitably shaped and which may be cast or otherwise formed as may be desired. This member I call "the supporting member."

The frame 2 is generally of oblong form, and it is provided with a rear cross bar 3, to which one of the parts of the harness or other structure that is to be connected, may be secured. The rear portion of said frame 2 is provided with a suitable opening 4, one wall of which is formed by the cross bar 3. A strap, chain, rope or other suitable device may be secured to the cross bar 3, passing through the opening 4. Near its other end the frame 2 is provided with a key-hole slot having a narrow or restricted portion 5, and an enlarged portion 6. Pivoted upon the frame 2 are a pair of dogs 7, 7, having their ends extending across the slot in the forward part of the frame 2, preferably substantially on the line where the enlarged and restricted portions of said slot join. The ends of these dogs meet substantially at the center of the slot and they are held normally with their points in contact with each other by a suitable spring 16, which engages a stationary pin 9 and also engages said dogs back of the pivots 8. The inner surfaces of the ends of said dogs are inclined or beveled, and are located inside of the pivotal points of said dogs. The rear ends of the dogs are preferably inturned and find a bearing against the walls of the large slot 4.

The pivots 8 for the dogs are located in the rear of the enlarged portion 6 of the key-hole slot, and the handle or wing ends may be inturned and bear against the opposite walls in the large recess in the frame, to serve as stops to limit the movement of said dogs. The pivots 8 are preferably located at some distance to the rear, or toward the base of the dogs, and to the rear of the enlarged portion of the key-hole opening in the frame.

A locking member 10 is provided with a stud having a head portion 11 and a restricted neck portion 12. The locking member may be secured to any device or article that is to be connected to the device or article attached to the cross bar 3. As here shown the locking member is provided with an open eye 13 to which a ring, link or other suitable device may be attached.

The portion of the frame 2 upon which the said dogs are pivoted is preferably cut away or made thinner, so that said dogs are practically seated in this recessed portion of the frame, as shown in Fig. 3 of the drawings.

In operating the device the supporting member is attached by a cross bar 3 to a trace, strap, or other device, of any suitable kind, and the locking member 10 is also suitably attached by the open eye 13, or by other means, to an article or device which it is desired to connect to the trace or other device connected to the cross bar 3. The head 11 on the stud of the locking member is passed from either side of the supporting member through the enlarged portion 6 of the orifice, so that the neck portion of said studs stands between the ends of said dogs. The locking member is then given a longitudinal movement in respect to the supporting member. This carries the side of the neck portion of the stud against the ends of the pivoted dogs, and as said dogs are pivoted to the frame at some distance back of the points to which pressure is applied, and as the inner surfaces of the ends of the dogs are inclined or beveled and are located inside of the pivotal points of said dogs, said dogs are caused to turn upon their pivots, the ends of the dogs swinging outward and permitting the stud to pass between them into the restricted portion 5 of the orifice or keyhole slot. This action is illustrated in Figs. 1 and 2 of the drawings. In Fig. 1 the position of the neck portion of the locking member is shown by dotted lines in the enlarged portion of the slot and with the rounded surface bearing against the inclined or beveled inner surface of the ends of the dogs. Pressure on the locking member tending to move the neck portion thereof toward the restricted part of the slot, causes, by reason of the inner surface of the ends of the dogs being inclined or beveled and being inside of the pivots 8, said dogs to be forced apart as shown in Fig. 2 of the drawings, and this movement continues until the neck portion of the locking member has passed beyond the ends of the dogs and entered the restricted portion of the slot in the supporting member. The spring 16 controlling the dogs immediately causes said dogs to snap together behind the neck portion of said lug. The neck portion of the lug will then occupy the position shown by full lines in Fig. 1, and pressure of said lug against the ends of the dogs does not tend to cause said dogs to open. It will now be impossible for this lug to move into the large part of the slot until the dogs have been forced apart by pressure applied to the wing portions 14 for the reason that as the ends of the dogs are inside of the pivots any pressure exerted upon their outer surfaces by the lug 12 tends to force the ends of said dogs more closely together. When it is desired to separate the parts, pressure is applied to the wing portions 14 of the said dogs. These wing portions as shown in the drawing project outward beyond the edge of the frame 2, and by pressing on the wing portions 14 of the dogs the points of the dogs are separated against the pressure of the spring 16. The stud can now be moved so as to bring its neck portion into the enlarged portion of the slot and the head can then be drawn out through the large portion of the opening and between the dogs, thereby disconnecting or uncoupling the device.

The details of the construction may obviously be varied in many particulars without departing from my invention.

I claim as my invention:

1. A connecting device comprising a supporting member and a locking member, the supporting member having an opening formed with a restricted portion and an enlarged portion, a pair of dogs pivoted upon said supporting member with their ends extending across said opening near the point where the restricted portion opens into the enlarged portion, and meeting substantially at the center of said opening, the inner surfaces of the ends of said dogs being inclined or beveled and located inside of the pivotal points of said dogs, and the locking member having a lug comprising a neck portion and an enlarged head portion, the head of said lug being adapted to pass through the enlarged portion of the opening in the supporting member, and the neck portion being adapted to engage the inner surface of the respective dogs near the ends thereof and open the dogs when one of said members is moved longitudinally in one direction in respect to the other member, and to hold said dogs closed upon an opposite movement of said members, said dogs also having wing portions in the rear of the pivots projecting outwardly beyond the walls of the supporting member.

2. A connecting device comprising a supporting member having a key-hole shaped slot formed therein, a pair of dogs pivoted upon said supporting member with their ends extending across said slot near its narrow portion and meeting substantially at the center of said slot, the inner surfaces of the ends of said dogs being inclined or beveled and located inside of the pivotal points of said dogs, in combination with a locking member having a lug comprising a neck portion and an enlarged head portion, the head of said lug being adapted to pass through the large part of the slot in the supporting member and the neck portion being adapted to pass between the ends of the dogs into the narrow portion of said slot, movement of said members in one direction, when the lug is in the large part of the slot in the supporting member, tending to press the neck portion of the lug against the beveled surfaces of the dogs and to open said dogs, and movement of the members in the opposite direction, when the locking member is in the small portion of the slot, tending to hold said dogs together, substantially as described.

3. A connecting device comprising in combination a supporting member consisting of a frame having a key-hole shaped slot, a pair of pivoted spring controlled dogs extending across said slot with their pivots located in the rear thereof and with the ends of said dogs meeting substantially at the center of said slot and inside of said pivots, and a locking member having a lug provided with a restricted neck portion and an enlarged head portion, said head portion being adapted to pass through the large part of said slot, and said neck portion being adapted to be drawn into the narrow part of the slot, the pressure of the lug against the dogs during said movement moving the dogs out of the path of movement of the lug, and said dogs preventing movement of the lug in the opposite direction, substantially as described.

In witness whereof I have hereunto set my hand this 31st day of December, 1913.

MARCUS RAY COWELL.

Witnesses:
EDWARD A. PAUL,
C. H. REHFUSS.

Copies of this patent may be obtained for five cents each, by addressing the "Commissioner of Patents, Washington, D. C."